United States Patent
Kim et al.

(10) Patent No.: US 7,030,885 B2
(45) Date of Patent: Apr. 18, 2006

(54) METHOD AND APPARATUS FOR MEASURING COLOR-TEXTURE DISTANCE, AND METHOD AND APPARATUS FOR SECTIONING IMAGE INTO PLURALITY OF REGIONS USING MEASURED COLOR-TEXTURE DISTANCE

(75) Inventors: Sang-kyun Kim, Kyungki-do (KR); Seong-deok Lee, Kyungki-do (KR); Chang-yeong Kim, Kyungki-do (KR); Pavel A. Chochia, Moscow (RU); Dmitry V. Sushko, Moscow (RU); Boris M. Miller, Moscow (RU)

(73) Assignee: Samsung Electronics Co., Ltd., Suwon (KR)

( * ) Notice: Subject to any disclaimer, the term of this patent is extended or adjusted under 35 U.S.C. 154(b) by 880 days.

(21) Appl. No.: 09/983,034

(22) Filed: Oct. 22, 2001

(65) Prior Publication Data

US 2002/0090133 A1 Jul. 11, 2002

(30) Foreign Application Priority Data

Nov. 13, 2000 (KR) ............................... 2000-67105

(51) Int. Cl.
*G09G 5/02* (2006.01)
*G09G 5/00* (2006.01)

(52) U.S. Cl. ...................... 345/589; 345/582; 345/591; 345/598; 345/639; 345/640; 382/164; 382/165; 382/194; 382/206; 382/219; 382/220; 382/221

(58) Field of Classification Search .............. 345/591, 345/598, 639, 640, 582, 589; 382/219–221, 382/164, 165, 173, 194, 195, 199, 206
See application file for complete search history.

(56) References Cited

U.S. PATENT DOCUMENTS 6,463,432 B1 * 10/2002 Murakawa ..................... 707/5
(Continued)

FOREIGN PATENT DOCUMENTS

WO WO 00/46749 A1 8/2000

OTHER PUBLICATIONS

Pavel A. Chochia, "Two Tasks in Image Enhancement Technology" *Optical Memory and Neural Networks*, vol. 7, No. 1, 1998, pp. 37-50.
(Continued)

*Primary Examiner*—Matthew C. Bella
*Assistant Examiner*—Antonio Caschera
(74) *Attorney, Agent, or Firm*—Buchanan Ingersoll PC

(57) ABSTRACT

A method and apparatus for measuring a color-texture distance and a method and apparatus for sectioning an image into a plurality of regions using the measured color-texture distance are provided. The method of measuring a color-texture distance includes the steps of: assigning different degrees of importance to a brightness difference, a saturation difference, and a hue difference between two points in a color feature space constituted of color feature values of pixels in an image, and adding the brightness difference, the saturation difference, and the hue difference in proportion to the assigned degrees of importance to calculate a color distance between the two points; obtaining a texture distance between the two points using a difference between texture feature values of the two points and weighting coefficients applied to multi scales of a texture, in a texture feature space constituted of texture feature values for the pixels; and multiplying a color weight value and a texture weight value by the color distance and the texture distance, respectively, adding the multiplication results to each other, and obtaining the color-texture distance between the two points. The degrees of importance are determined on the basis that a hue is more important than a brightness or a saturation, a color becomes black as the brightness approaches an absolute value, and the hue has an arbitrary value as the saturation approaches the absolute value.

21 Claims, 9 Drawing Sheets

U.S. PATENT DOCUMENTS 6,674,905 B1 * 1/2004 Matsugu et al. ............ 382/199
6,731,792 B1 * 5/2004 Tanaka ....................... 382/164

OTHER PUBLICATIONS

E. J. Carton, "Some Fundamental Texture Analysis Techniques" Univ of Maryland, Jan. 1974, pp. 27.

L. Van Gool, "Texture Analysis Anno" CVGIP 29, 1985, pp. 336-357.

G. M. Hunter, "Operation of Images Using Quad Trees", IEEE Trans., vol. PAMI-1, No. 2, Apr. 1979, pp. 145-153.

A. Rosenfeld, "Quadtrees and Pyramids for Pattern Recognition and Image Analysis" Proceedings of 5th Int. Conference on Pattern Recognition, 1980, pp. 802-811.

Frese, Thomas, et al., "*A Methodology for Designing Image Similarity Metrics Based On Human Visual System Models,*" 3016 Proceedings of the SPIE pp. 472-483 (1997) Bellingham, Virginia.

Fairchild, Mark color appearance models pp. 219-222, Addison Wesley.

* cited by examiner

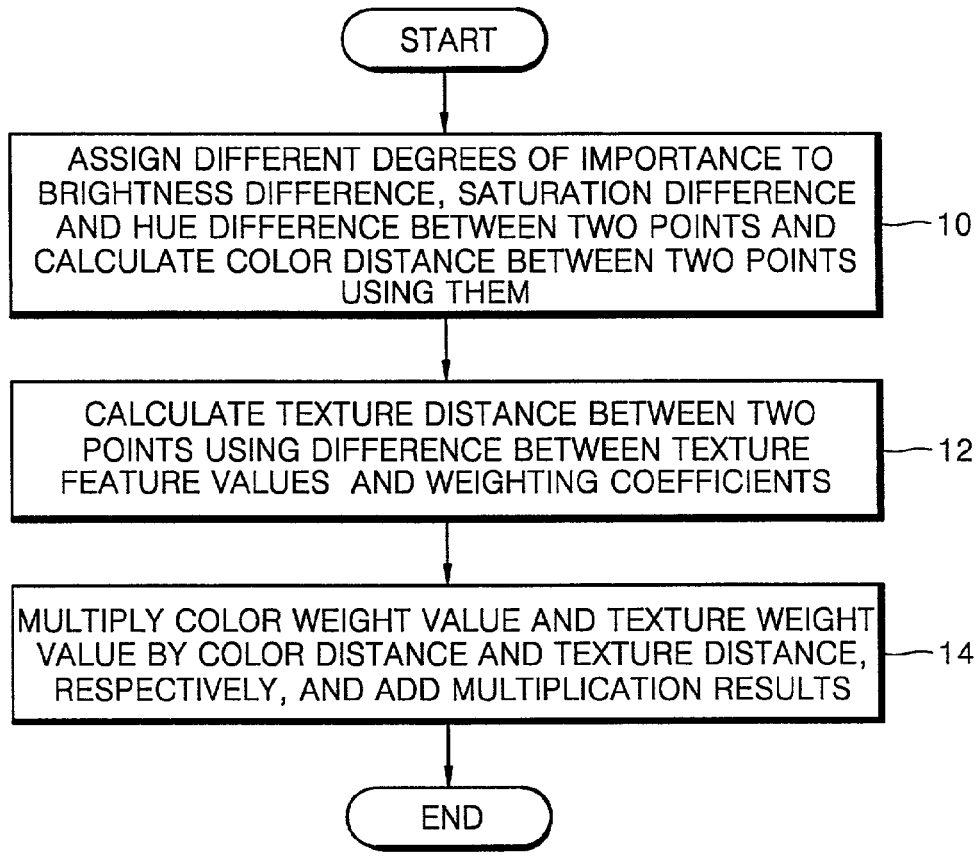
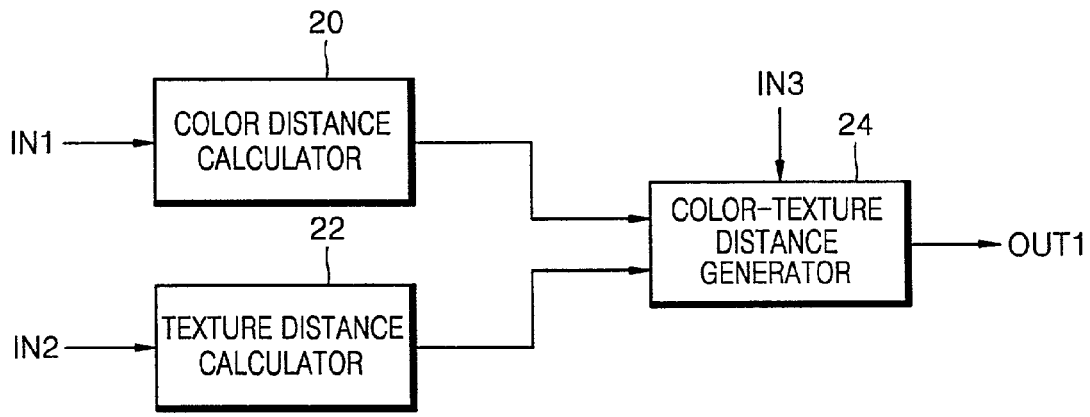

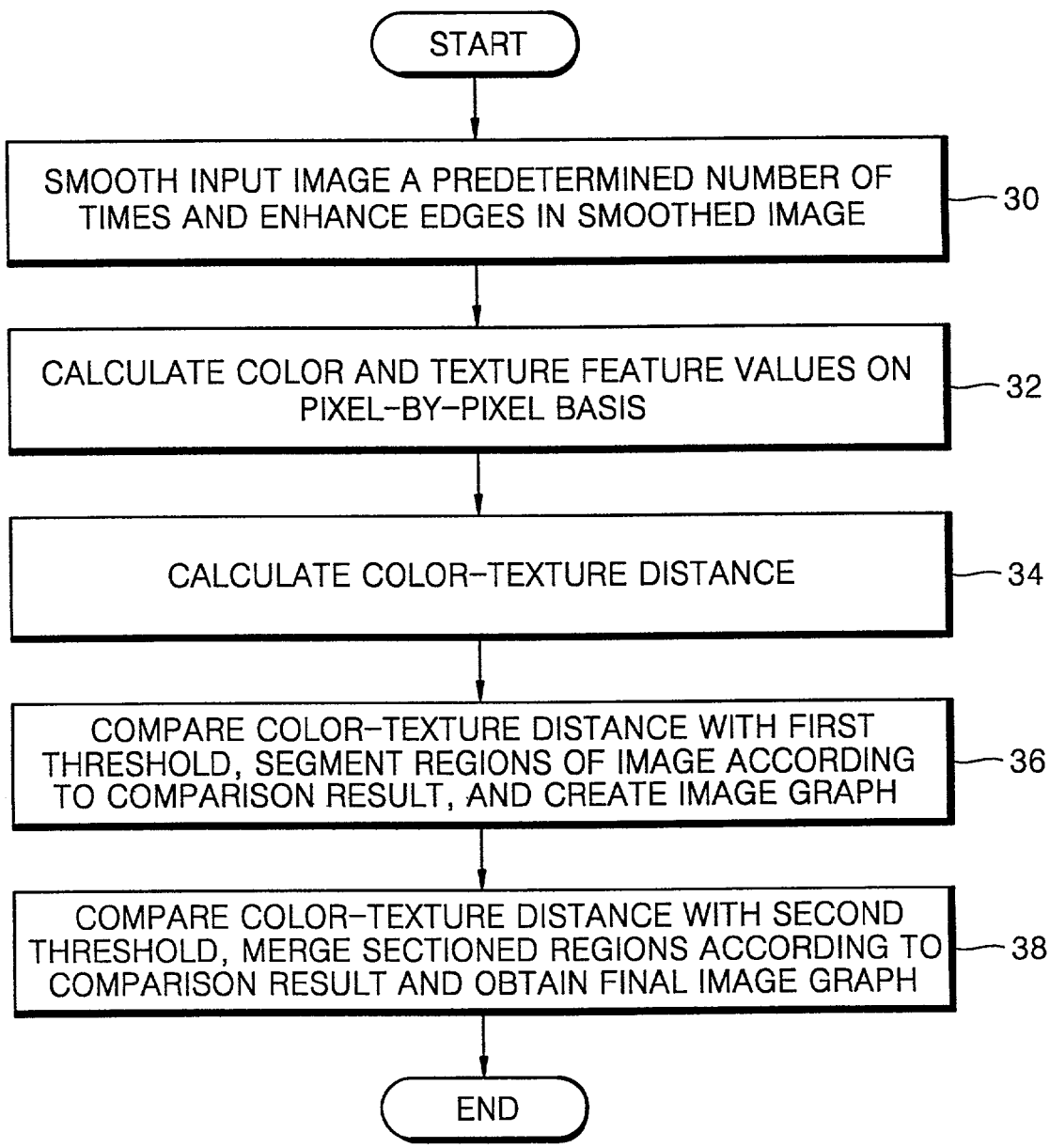

METHOD AND APPARATUS FOR MEASURING COLOR-TEXTURE DISTANCE, AND METHOD AND APPARATUS FOR SECTIONING IMAGE INTO PLURALITY OF REGIONS USING MEASURED COLOR-TEXTURE DISTANCE

BACKGROUND OF THE INVENTION

1. Field of the Invention

The present invention relates to the field of image processing, and more particularly, to a method and apparatus for measuring color-texture distance between pixels in an image and a method and apparatus for sectioning an image into a plurality of regions using the measured color-texture distance.

2. Description of the Related Art

Important factors in forming an image of object(s) include color, illumination, shape, texture, positions of the objects, mutual geometry of the objects, and the position of the observer relative to an image forming apparatus. Image formation is affected by various devices and environmental conditions. Ideal image segmentation involves effectively distinguishing a meaningful object or a region of the same color from other objects or background in a form that humans can recognize, regardless of the above conditions for image formation. A number of conventional image segmentation techniques for accomplishing this have been suggested.

A representative image segmentation approach is disclosed in U.S. Pat. No. 5,751,450 entitled "Method and System for Measuring Color Difference". The conventional image segmentation approach discussed therein includes calculating a color distance uniformly and sectioning an image into a plurality of regions using the calculated color distance. A major problem with this technique used to separate an object included in an image from background of the image is that if two pixels of the same hue in an area of an object have different brightness and saturation components, they are treated as different color image. The problem is basically caused by sectioning the image using the uniformly measured color distances. Thus, it is difficult to properly section an image using the conventional image segmentation technique because two pixels belonging to the same object are treated as belonging to different objects.

Another problem of the above conventional image segmentation technique is that if brightness or saturation is below a predetermined level, a background pixel and a pixel in a target object which have different hues are classified as the same color image. Thus, since pixels included in two separate regions are classified as belonging to the same region, it is not possible to precisely and accurately section the image into a plurality of regions.

Yet another shortcoming of conventional image segmentation is that precise image segmentation is not possible because the merging of two regions is determined without considering the sizes of the regions or the lengths of boundaries between the regions.

SUMMARY OF THE INVENTION

To solve the above problems, it is a first objective of the present invention to provide a method of measuring color-texture distance, by which the color-texture distance between two points can be precisely measured in a color-texture feature space, independent of relative or absolute changes in hue, brightness, and saturation of each point.

It is a second objective of the present invention to provide an apparatus for measuring a color-texture distance, which performs the color-texture distance measurement method.

It is a third objective of the present invention to provide a method of sectioning an image into a plurality of regions, by which a region of the same color and/or texture in the image can be distinguished accurately using the measured color-texture distance.

It is a fourth objective of the present invention to provide an apparatus for sectioning the image into a plurality of regions.

In order to achieve the first objective, the present invention provides a method for measuring a color-texture distance. The method includes the steps of: (a) assigning different degrees of importance to a brightness difference, a saturation difference, and a hue difference between two points in a color feature space constituted of color feature values of pixels in an image and adding the brightness difference, the saturation difference, and the hue difference in proportion to the assigned degrees of importance to obtain a color distance between the two points; (b) obtaining a texture distance between the two points using a difference between texture feature values of the two points and weighting coefficients applied to multi scales of a texture, in a texture feature space constituted of texture feature values for the pixels; and (c) multiplying a color weight and a texture weight by the color distance and the texture distance, respectively, adding the multiplication results to each other, and obtaining the color-texture distance between the two points. The degrees of importance are determined on the basis that a hue is more important than a brightness or a saturation, a color becomes black as the brightness approaches an absolute value, and the hue has an arbitrary value as the saturation approaches the absolute value.

In order to achieve the second objective, the present invention provides a method for sectioning an input image into a plurality of regions using the measured color-texture distance. The method includes the steps of: smoothing the input image a predetermined number of times and enhancing edges in the smoothed image; calculating the color feature values and texture feature values on a pixel-by-pixel basis and returning to step (a); after step (c), comparing the color-texture distance with a first threshold value, segmenting the image into regions according to the comparison result, and generating an image graph from a fundamental region section map including information about the segmented regions of the image, based on a pyramidal recursive approach; and comparing the color-texture distance with a second threshold value, and merging regions marked in the image graph according to the comparison result to generate a final image graph.

In order to achieve the third objective, the present invention provides an apparatus for measuring a color-texture distance. The apparatus includes: a color distance calculator that assigns different degrees of importance to a brightness difference, a saturation difference, and a hue difference between two points in a color feature space constituted of color feature values for pixels in an image, adds the brightness difference, the saturation difference, and the hue difference in proportion to the assigned degrees of importance, and outputs the added result as a color distance between the two points; a texture distance calculator that inputs texture feature values for the two points in a texture feature space constituted of texture feature values for the pixels in the image, detects a difference between the input texture feature values, calculates a texture distance between the two points from weighting coefficients applied to multiple scales of a texture and the detected difference, and outputs the calculated texture distance; and a color-texture distance generator that multiplies a color weight value by the color distance output from the color distance calculator, multiplies a texture weight value by the texture distance output from the texture distance calculator, adds the multiplication results together, and outputs the addition result as a color-texture distance. The degrees of importance are determined based on the facts that a hue is more important than a brightness or a saturation, a color becomes black as the brightness approaches an absolute value, and the hue has an arbitrary value as the saturation approaches the absolute value.

In order to achieve the fourth objective, the present invention provides an apparatus for sectioning an input image into a plurality of regions using the color-texture distance output from the color-texture distance generator. The apparatus includes: an image preprocessor that smooths the input image a predetermined number of times, enhances edges in the smoothed image, and output the resulting image; a feature value calculator that calculates the color feature values and the texture feature values from the image output from the image preprocessor for each pixel and outputs the calculated color and texture feature values to the apparatus for measuring a color-texture distance; a main region section unit that compares the color-texture distance output from the color-texture distance generator with a first threshold value, segments the image into regions according to the comparison result, generates an image graph from a fundamental region division map including information about the segmented regions based on a pyramidal recursive approach, and outputs the generated image graph; and an image graph simplification unit that compares the color-texture distance output from the color-texture distance generator with a second threshold value, simplifies the image graph according to the comparison result, and outputs a final image graph generated from the simplified image graph.

BRIEF DESCRIPTION OF THE DRAWINGS

The above objectives and advantages of the present invention will become more apparent by describing in detail preferred embodiments thereof with reference to the attached drawings in which:

FIG. 1 is a flowchart showing a method of measuring color-texture distance according to the present invention;

FIG. 2 is a block diagram of an apparatus for measuring color-texture distance according to the present invention by performing the color-texture distance measurement method shown in FIG. 1;

FIG. 3 is a flowchart showing a method of sectioning an image into a plurality of regions according to the present invention;

DETAILED DESCRIPTION OF THE INVENTION

Figure 4:
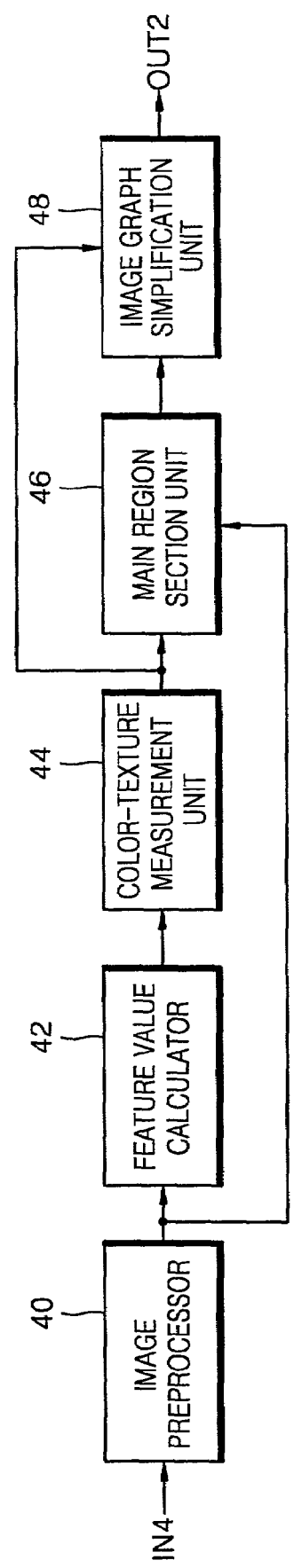
FIG. 4 is a block diagram of an apparatus for sectioning an image into a plurality of regions according to the present invention by performing the method shown in FIG. 3.

Referring to FIG. 1, a method of measuring a color-texture distance according to the present invention includes the steps of calculating color and texture distances (steps 10 and 12) and obtaining a color-texture distance using the color distance, the texture distance, and weights corresponding to the color and texture distances (step 14).

Referring to FIG. 2, an apparatus for measuring a color-texture distance which performs the color-texture distance measurement method shown in FIG. 1 includes a color distance calculator 20, a texture distance calculator 22, and a color-texture distance generator 24. Referring to FIG. 1, the color distance calculator 20 shown in FIG. 2 inputs color feature values of each of two points x and y such as brightness (B), saturation (S), and hue (H) through an input terminal IN1 in a color feature space composed of color feature values of pixels in an image. Then, the color distance calculator 20 assigns different degrees of importance to a difference between input brightnesses, a difference between input saturations, and a difference between input hues, adds the brightness difference, the saturation difference, and the hue difference in proportion with the assigned degrees of importance, and outputs the added result to the color-texture distance generator 24 as the color distance between the two points x and y (step 10). In this case, the color-texture distance measurement method according to the present invention determines the degree of importance in a color feature space composed of BHS using the following three standard conditions. First, hue (H) is a more important factor in determining the degree of importance than brightness (B) and saturation (S). Second, if brightness (B) approaches an absolute value '0', the color of an image is black without regard to hues (H) or saturation (S). Third, if saturation (S) approaches an absolute value '0', the color of an image is gray and hue (H) has an arbitrary value.

In a preferred embodiment of the present invention, the color distance calculator 20 assigns degrees of importance determined on the basis of the above-mentioned standard conditions to the brightness difference, the saturation difference, and the hue difference to obtain a color difference $D_{BHS1}(x,y)$ expressed by Equation (1):

$$D_{BHS1}(x,y) = W_B|B(x)-B(y)| + F_H[\min(S(x),S(y))](a\overline{B}+b) \\ \overline{S}|H(x)-H(y)| + F_S(\overline{S})\overline{B}|S(x)-S(y)| \quad (1)$$

Here, B(o), H(o), and S(o) denote color feature values, i.e., brightness, hue, saturation of point o (o refers to x or y), respectively, which will be described below in detail, and $\overline{B}$ and $\overline{S}$ denote the average of B(x) and B(y) and the average of S(x) and S(y), respectively. $W_B$, a, and b are constants, and $F_S(j)$ and $F_H(j)$ denote linear correction functions for saturation and hue, respectively. In this case, the linear correction function $F_S(j)$ or $F_H(j)$ is employed to suppress the difference between hue and saturation under conditions of low brightness and low saturation. For this purpose, the linear correction function $F_S(j)$ or $F_H(j)$ is j if j is less than 1, and 1 if j is 1 or greater.

As defined by Equation (1), the brightness difference B(x)–B(y), the hue difference H(x)–H(y), and the saturation difference S(x)–S(y) have different coefficients which are determined according to degrees of importance as described above.

In another preferred embodiment of the present invention, the color distance calculator 20 assigns degrees of importance determined based on the above-mentioned standard conditions to the brightness difference, the saturation difference, and the hue difference to obtain a color distance $D_{BHS2}^2(x,y)$ expressed by Equation (2):

$$D_{BHS2}^2(x,y)=W_B[B(x)-B(y)]^2+W_H F_B[B(x),B(y)]F_S[S(x),S(y)][H(x)-H(y)]^2+W_S F_B[B(x),B(y)][S(x)-S(y)]^2 \quad (2)$$

where $W_H$ and $W_S$ are constants and $F_S(\cdot,\cdot)$ and $F_B(\cdot,\cdot)$ denote nonlinear correction functions for saturation and brightness, respectively.

As is evident from Equation (2), the square of brightness difference $[B(x)-B(y)]^2$, the square of hue difference $[H(x)-H(y)]^2$, and the square of saturation difference $[S(x)-S(y)]^2$ are multiplied by different coefficients which are determined according to degrees of importance as described above.

After step 10 has been performed by the color distance calculator 20, the texture distance calculator 22 inputs texture feature values of two points x and y, which will be described below, through an input terminal IN2 in a texture feature space composed of texture feature values for pixels. Then, the texture distance calculator 22 detects a difference between the input texture feature values, calculates a texture distance between the two points x and y using weighting coefficients applied to multiple scales of a texture and the detected difference, and outputs the calculated texture distance to the color-texture distance generator 24 (step 12). In a preferred embodiment of the present invention, a texture distance $D_t(x,y)$ is calculated as expressed by Equation (3):

$$D_t(x,y) = \sum_{z=1}^{Z} W^z \sum_{k=1}^{K} |t_k^z(x) - t_k^z(y)| \quad (3)$$

Here, $W^z$ is a weighting coefficient applied to the multiple scales of a texture and $t_k^z(x)$ and $t_k^z(y)$ denote texture feature values of x and y where k=1, 2, ..., K and z=1, 2, ..., Z (Z is a predetermined number). Furthermore, KZ texture feature values exist in the texture feature space.

Following step 12, as expressed by Equation (4), the color-texture distance generator 24 multiplies a color weight value $w_c$ by the color distance $D_{BHS1}$ or $D_{BHS2}$ shown in Equation (1) or (2) received from the color distance calculator 20, multiplies a texture weight value $w_t$ by the texture distance $[D_t(x,y)]$ shown in Equation (3), adds the multiplication results to each other, and outputs the addition result to an output terminal OUT1 as a color-texture distance $[D(x,y)]$ between the two points x and y. Here, if the color-texture distance $[D(x,y)]$ output from the color-texture distance generator 24 is used for sectioning an image, the color-texture distance generator 24 inputs values such as average texture value required for calculating a color weight value and a texture weight value through an input terminal IN3.

$$D(x,y)=w_c D_c(x,y)+w_t D_t(x,y) \quad (4)$$

A method of sectioning an input image into a plurality of regions using the color-texture distance $[D(x,y)]$ measured by the method and apparatus of FIGS. 1 and 2 according to the present invention and the structure and operation of an apparatus for performing the method will now be described in detail with reference to the accompanying drawings.

FIG. 3 is a flowchart for explaining the method of sectioning an input image into a plurality of regions according to the present invention. The method includes calculating color and texture feature values after pre-processing an input image (steps 30 and 32) and comparing a measured color-texture distance with first and second threshold values, respectively, to divide and merge the image (steps 34–38).

FIG. 4 is a block diagram of the apparatus for sectioning an image into a plurality of regions, which performs the method shown in FIG. 3. The apparatus includes an image preprocessor 40, a feature value calculator 42, a color-texture measurement unit 44, a main region section unit 46, and an image graph simplification unit 48. Here, the color-texture measurement unit 44 performs the same function as the color-texture distance measuring apparatus of FIG. 2, and thus a detailed explanation will be omitted.

The image preprocessor 40 shown in FIG. 4 repeatedly smooths an image input through an input terminal IN 4 predetermined number of times, enhances edges in the smoothed image to obtain a preprocessed image, and outputs the preprocessed image to the feature value calculator 42 (step 30). Step 30 will now be described in detail.

In general, an input image such as that captured through a camera sensor or a video image signal is composed of two portions: noise and a meaningful signal. Here, each portion of an image includes different kinds of information. This method for statistically dividing components allows the input image to be broken into different kinds of components. For example, in step 30, edge-preserving image smoothing is performed to filter out noise by smoothing the input image and to preserve edges of an object by decomposing the smoothed image into a portion having an outstanding edge and a portion having no outstanding edge. This edge-preserving image smoothing is disclosed in "Two Tasks in Image Enhancement Technology" by P. A. Chochia, *Optical Memory and Neural Networks,* 1998, and summarized as follows.

If a set $\{x\}$ of pixels in a window of a predetermined size is defined by Equation (5), windows of different sizes are applied to smooth pixels excluding those having outstanding brightness values among brightness values of pixels in each window.

$$\{x\}=x_1 \le x_2, \ldots, \le x_n (x_i \epsilon W_{mn}) \quad (5)$$

Luminance (or brightness) value $I^q_{mn}$ obtained after smoothing of an input image is repeated q times is calculated in a window $W^q_{mn}$ using the previously obtained luminance (or brightness) value $I^{q-1}_{mn}$, as expressed by Equation (6):

$$1_{mn}^q = \frac{\sum_{x \in W_{mn}^q} XW(X - 1_{mn}^{q-1})}{\sum_{x \in W_{mn}^q} W(X - 1_{mn}^{q-1})} \quad (6)$$

Here, w(x') is a predetermined weight function. If x' is between $-\sigma$ and $+\sigma$ w(x')=1, and if not, w(x')=0. The luminance (or brightness) value $I^{q-1}_{mn}$ refers to a central value of the weight function w(x') in a previous window $W^{q-1}_{mn}$. $x_{mn}$ is used in place of $I^{q-1}_{mn}$ in initial smoothing of the input image. In this case, a brightness value $s'_{mn}$ of a pixel which has been smoothed Q times is represented by $I^Q_{mn}$. That is, the brightness value $s'_{mn}$ refers to the result of smoothing a pixel with Q windows. It is experimentally shown that smoothing is preferably performed twice. A square window having sides of length 3–5 pixels was used for first smoothing, and a square window having sides of length 10–40 pixels was used for second smoothing. The use of these windows has proven effective in extracting smoothed components from an image which contains a large amount of noise, and in this case, an acceptable mean square error of a computed result value was within 0.5%.

Following step 30, the feature value calculator 42 shown in FIG. 4 computes color feature values and texture feature values on a pixel-by-pixel basis from the preprocessed image output from the image preprocessor 40, and outputs the computed color and texture feature values to the color-texture measurement unit 44 (step 32).

In order to obtain the color feature values computed in step 32, first, a color feature space and a texture feature space are used together to provide a basis for a general feature space. In this case, color feature values of each pixel in an image can be specified by defining the color and texture feature spaces. The color feature values, i.e., brightness (B), hue (H), and saturation (S) of each pixel, are expressed by Equations (7):

$$B = \sqrt{\frac{r^2 + g^2 + b^2}{3}} \quad (7)$$

$$H = \frac{120°(b-u)}{g+b-2u} + 60°, \text{ if } r = u$$

$$\frac{120°(r-u)}{b+r-2u} + 180°, \text{ if } g = u$$

$$\frac{120°(g-u)}{r+g-2u} + 300°, \text{ if } b = u$$

$$S = 1 - \frac{u}{r+g+b}$$

where r, g and b denote color values of each pixel and u=min(r,g,b).

Next, with reference to the texture feature values calculated in step 32, each of texture feature values having multiple scales and multiple orientations used for forming a texture feature space is obtained by calculating a local variation v and a local oscillation f for each pixel in multiple directions and combining them. This texture image analysis is called Gray Level Difference Method. A Gray Level Difference Method is disclosed in "Some Fundamental Texture Analysis Techniques" (E. J. Carton, J. S. Weszka and A. Rosenfeld, TR-288, Univ of Maryland, 1974) and "Texture Analysis Anno" (L. Van Gool, P. Dewaele and A. Oosterlinck, CVGIP, 1985). The brightness value (B) of an image defined by Equation (7) is used in extracting the texture feature values.

With regard to local variation, pixels of length 2 L having a pixel (m,n) as a center exist in an image, and the pixels are turned around the pixel (m,n) at angle $a_k$=k$\pi$/K, where k=0, 1, ..., K-1. Assuming that $I_i$ is the brightness value (B) of any pixel among the pixels uniformly arrayed in this way, where $-L \leq i \leq L$, upward weight variation $v^+$ and downward weight variation $v^-$ are expressed by Equations (8):

$$V^+ = \sum_{i=-L}^{L-1} w_i d_i, \text{ if } d_i > 0 \quad (8)$$

$$V^- = \sum_{i=-L}^{L-1} w_i(-d_i), \text{ if } d_i < 0$$

where $d_i$ denotes a gradient $I_{i+1} - I_i$ between luminance (or brightness) values of adjacent pixels in the pixel array and $w_i$ is a cosine weight function Acos(i$\pi$/(2 L+1)). A coefficient A in the cosine weight function $w_i$ is used for establishing $$\sum_{i=-L}^{L} w_i = 1.$$

In this case, local variation $v_k$ is designated as the smaller of the upward weight variation $v^+$ and the downward weight variation $v^-$ as expressed by Equation (9):

$$v_k = \min(v_k^+, v_k^-) \quad (9)$$

A local oscillation f is defined by the number of $d_i$, the magnitudes of which exceed a predetermined sensitivity at the same time that the signs are changed among $d_i$ calculated along the length 2 L of the array, where $-L \leq i \leq L$. In this case, local variation value $v_k$ and local oscillation value $f_k$ for each pixel are multiplied to obtain texture feature value $\hat{t}_k$(=$v_k f_k$) for a corresponding pixel. Furthermore, to make the calculated texture feature values more equal, Equation (10) is used:

$$t_k = \tanh\left[\alpha \sum_h \hat{t}_k(h)\right] \quad (10)$$

As is evident from Equation (10), the texture feature value $t_k$ are smoothed as an average of a window having a size of h×1, and high and low texture feature values are made lower and higher, respectively, due to modification using a hyperbolic tangent function 'tanh'. In this case, if the size of an image is reduced Z times (by a half every time) at different frequencies, the texture feature values $t_k$ for each pixel defined by Equation (10) can be expressed by Equation (11):

$$t_k^Z = \tanh\left[\alpha \sum_h \hat{t}_k^Z(h)\right] \quad (11)$$

As is evident from Equation (11), KZ texture feature values $t_k^z$ for each pixel are produced.

After step 32 has been performed, the color-texture measurement unit 44 shown in FIG. 4 is configured as shown in FIG. 2 to measure a color-texture distance according to the color-texture distance measurement method shown in FIG. 1 and output the measured color-texture distance to the main region section unit 46 (step 34). Following step 34, using a pyramidal recursive approach, the main region section unit 46 compares a color-texture distance measured by the color-texture measurement unit 44 with a first threshold value Th1, segments regions of the preprocessed image received from the image preprocessor 40 according to the comparison result, generates an image graph from a fundamental region division map including information about the segmented regions, and outputs the image graph to the image graph simplification unit 48 (step 36). That is, the main region section unit 46 perceives relationships between pixels in the preprocessed image and converts the preprocessed image into a vector image having groups of small regions.

The pyramidal recursive approach used by the main region section unit 46 is disclosed in "Operation of Images Using Quad Trees" (G. M. Hunter and K. Steiglitz, IEEE Trans., PAMI-1, 1979) and "Quadtrees and Pyramids for Pattern Recognition and Image Analysis" (A. Rosenfeld, Proceedings of $5^{th}$ Int. Conference on Pattern Recognition, 1980). According to this pyramidal recursive approach, first, an image is divided into groups including non-overlapping regions. Second, images whose sizes become sequentially smaller and having multiple scales or resolutions are generated. Third, a uniform rule is selected for establishing the relationship between an element of a lower layer and an element of an upper layer. Fourth, the rule is applied in an iterative manner to all regions of all layers.

A method of making a fundamental region division map in the main region section unit 46 shown in FIG. 4 based on the above pyramidal recursive approach will now be described.

Figure 5:
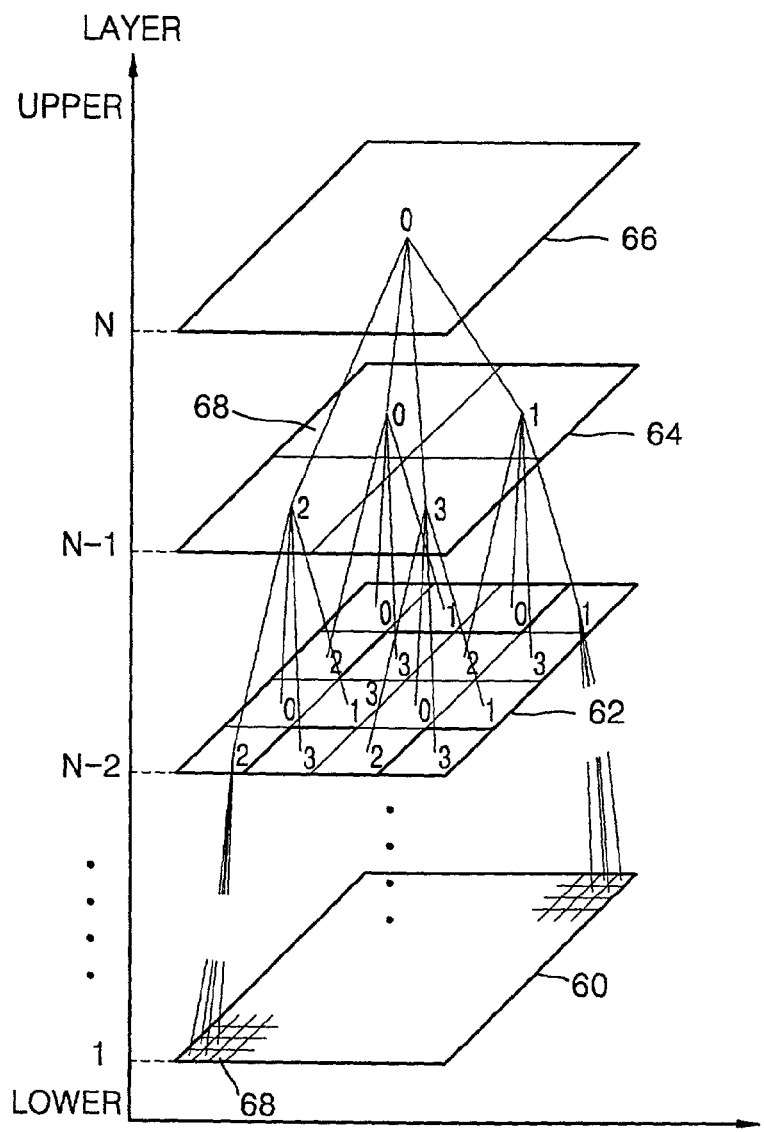
FIG. 5 shows a structure in which a each region of each layer is divided into 4 regions in the next lower layer.

FIG. 5 shows a structure in which each region of each layer is divided into 4 regions in the next lower layer. The quadtree structure consists of a first layer 60, . . . , an N–2-th layer 62, an N–1-th layer 64, and an N-th layer 66, Here, the first layer 60 is composed of a plurality of pixels 68 and an ordinate of the quadtree structure denotes a layer.

According to the pyramidal recursive approach, the following operations are performed through a direct pass and an indirect pass in the form of a quadtree as shown in FIG. 5 in order to provide a fundamental region section map. First, the operation performed through the direct pass will now be described. The direct pass refers to the pass of the direction from the lowest layer, which is the entire image 60, to the uppermost layer 66 having a single node 0. An iterative analysis is performed on all pyramid layers 60, . . . , 62, 64, and 66 in the direct pass. The operation performed through a direct pass is to form a pyramidal structure as shown in FIG. 5 and determine information about each tree node such as an average brightness value and an edge line. For example, since each group of four nodes on the N–2-th layer 62 forms a corresponding node on the N–1-th layer 64, each node in a quadtree structure includes information about four nodes on its lower layer as well. The principle of a pyramidal recursive approach lies in comparing and analyzing neighboring pixels or regions and merging them. To accomplish this, it is necessary to generate edge maps that define edges for all layers. If the distance between two pixels in each layer is greater than a first threshold value Th1, a horizontal or vertical edge between the two pixels is marked.

Any one of the second layer to the N-th layer 66 contains the content of edge maps of its lower layer.

Figure 6:
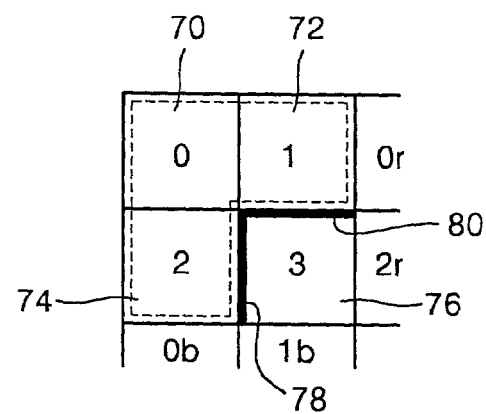
FIG. 6 shows four image element regions that can exist on each layer shown in FIG. 5 and the adjacent regions.

FIG. 6 shows four image element regions 70, 72, 74, and 76, which can exist on each layer shown in FIG. 5, and regions 0r, 2r, 0b, and 1b adjacent to the regions 72, 74, and 76, wherein the reference numeral of each region denotes the node number of each region.

In order to produce an edge map of each layer, first, a color-texture distance between the regions 70 and 72, a color-texture distance between the regions 74 and 76, a color-texture distance between the regions 70 and 74, and a color-texture distance between the regions 72 and 76 are calculated as expressed by Equation (4). In this case, a color weight value $w_c$ and a texture weight value $w_t$ in Equation (4) are predefined values. That is, the color-texture distance generator 24 multiplies a predetermined color weight value $w_c$ by a color distance, multiplies a predetermined texture weight value $w_t$ by a texture distance, adds the multiplication results together, and outputs the result as a color-texture distance to the main region section unit 46 through the output terminal OUT1. An edge is marked by a bold line between the regions, the color-texture distances of which exceed the first threshold value Th1. The regions whose edges are not marked by bold lines is considered as the same region having the same characteristics (color or texture). For example, if the color-texture distance between the regions 72 and 76 and the color-texture distance between the regions 74 and 76 exceed the first threshold value Th1, horizontal and vertical edges 80 and 78 are indicated between the region 76 and each of the regions 72 and 74, thereby distinguishing the regions 70, 72, and 74 from the different region 76.

Next, if the regions 70, 72, 74, and 76 shown in FIG. 6 belong to quadrant II of the N–2-th layer 62 shown in FIG. 5, average values of brightnesses (B), hues (H) and saturations (S), of the regions 70, 72, and 74 having the same characteristics are sent to a corresponding node 68 of the N–1-th layer 64 which is its upper layer. On the other hand, information about the remaining region 76 such as brightness (B), hue (H) and saturation (S) is not sent to the corresponding node 68 of the N–1-th layer 64 but remains therein.

Last, an edge map for an upper layer is produced. For example, right and bottom edges of the corresponding region 68 of the N–1-th layer 64, in which the four regions 70, 72, 74, and 76 are combined, are defined with edge map information created from the four regions 70, 72, 74, and 76 in quadrant II of the N–2-th layer 62. That is, the edge(s) for the N–1-th layer 64 are defined between the regions 72 and 76 and the regions 0r and 2r and between the regions 74 and 76 and the regions 0b and 1b. When all operations performed in the direct pass are completed in this way, each region of each layer may belong to an upper layer or include regions of a lower layer.

After all operations in the direct pass have been performed, operations are performed in an inverse pass, which refers to the pass of the direction from the uppermost layer 66 to the first layer 60. An analysis performed on a single node of each layer will now be described.

First, if a node of a region separated in each layer has no region number, the node is assigned a new region number. For example, if nodes 0, 1, and 2 in the N–1-th layer 64 belong to the same region and node 3 belongs to a different region, the same region where the nodes 0, 1, and 2 are merged is assigned a region number 1' while node 3 which is the separate region is assigned a new region number 2'.

Next, if the node has been already assigned a region number, that region number is assigned to nodes of a lower layer which are connected to the node having the region number in performing operation through the direct pass. For example, it is assumed that nodes 1, 2, and 3 in quadrant I of the N−2-th layer 62 belong to the same region and the remaining node 0 belongs to a different region in quadrant I of the N−2-th layer, and nodes 0, 1, and 2 in each of quadrants II, III, and IV belong to the same region and remaining nodes 3 belong to a different region. In this case, the nodes 1, 2, and 3 of quadrant I are assigned the region number 1' which has been assigned to the node 1 of the N−1-th layer 64, and the node 0 belonging to the different region is assigned a new region number 3'. Similarly, the nodes 0, 1, and 2 of quadrants II and III are assigned the region number 1' which has been assigned to each of nodes 0 and 2 of the N−1-th layer 64, and the nodes 0, 1 and 2 of quadrant IV are assigned the region number 2' which has been assigned to the node 3 of the N−1-th layer 64, while the nodes 3 of quadrants II, III, and IV which belong to different regions are assigned new region numbers 4', 5', and 6', respectively. After all operations in the inverse pass have been performed, a fundamental region division map required for region segmentation is produced.

Figure 7:
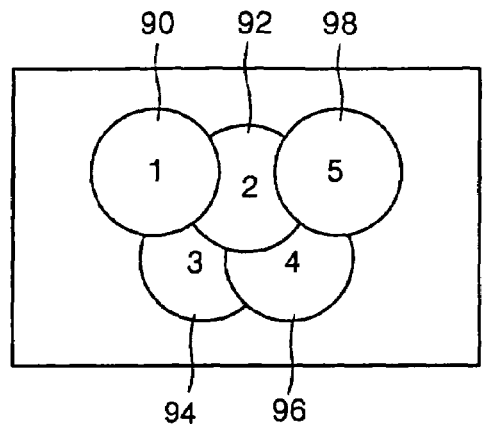
FIG. 7 is an example of a fundamental region division map.
Figure 8:
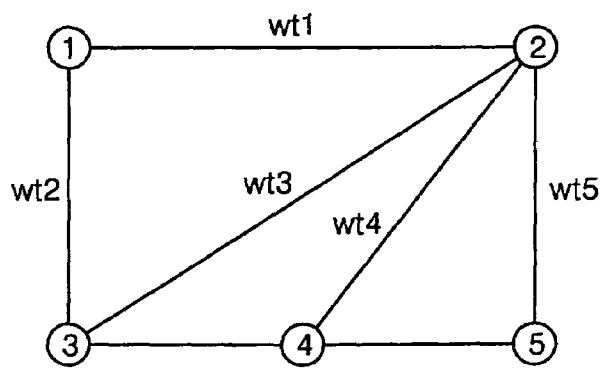
FIG. 8 is an example of an image graph generated from the fundamental region division map shown in FIG. 7.

FIG. 7 is an example of a fundamental region division map consisting of five regions 90, 92, 94, 96, and 98 which are assigned region numbers 1, 2, 3, 4, and 5, respectively. FIG. 8 is an example of an image graph generated from the fundamental region division map shown in FIG. 7. As is evident from FIG. 8, adjacent regions on the fundamental region division map are connected to one another.

The main region section unit 46 generates the image graph shown in FIG. 8 using the fundamental region division map shown in FIG. 7 and stores information contained in each region such as the number of pixels or average color. Here, the image graph shown in FIG. 8 provides information about what regions are adjacent to one another in the fundamental region division map of FIG. 7 and information about weight values wt1, wt2, wt3, wt4, and wt5 for lengths of edges between adjacent regions. As described above, the main region section unit 46 segments an image into regions using a pyramidal recursive approach, thereby providing advantages of securing closure of regions or clarifying the segmented regions.

Following step 36, the color-texture distance output from the color-texture distance generator 24 is compared with a second threshold value θ. Then, the image graph generated by the main region section unit 46 is simplified according to the comparison result, and the simplified image graph is output through an output terminal OUT2 as a final image graph (step 38).

In order to obtain the color-texture distance used in step 38, the color-texture distance generator 24 employs features of segmented regions instead of a predetermined color weight value $w_c$ and a predetermined texture weight value $w_t$. The features of two arbitrary segmented regions u' and v' defined on a fundamental region division map are a color weight value $w_c(u', v')$ and a texture weight value $w_t(u', v')$, which vary depending on a texture degree t(u', v'), the size p(u', v') and saturation s(u', v') for the segmented regions u' and v'. That is, the color-texture distance generator 24 multiplies a variable color weight value $w_c(u', v')$ and a variable texture weight value $w_t(u', v')$ by the color distance as expressed by Equation (1) or (2) and the texture distance as expressed by Equation (3), respectively, adds the multiplication results together, and outputs the added result to the image graph simplification unit 48 as a color-texture distance.

Figure 9:
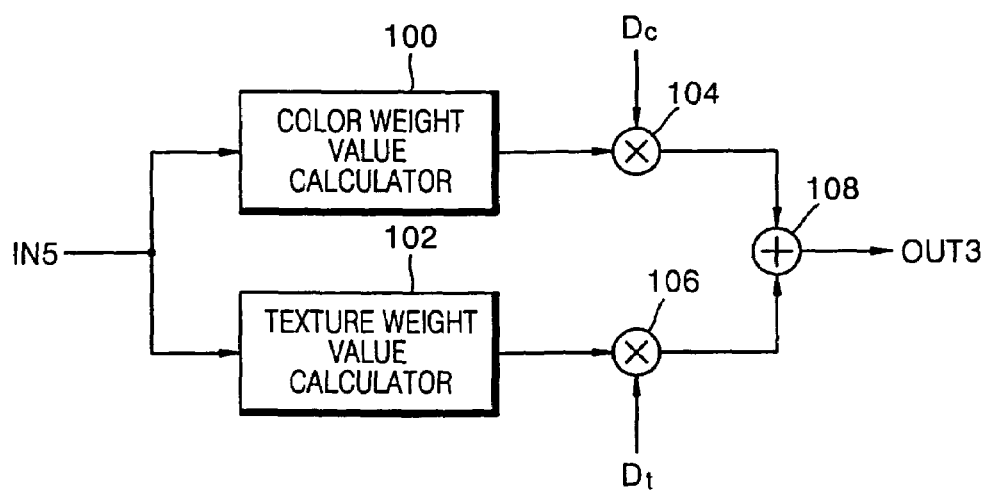
FIG. 9 is a block diagram of the color-texture distance generator shown in FIG. 2 according to a preferred embodiment of the present invention.

FIG. 9 is a block diagram of the color-texture distance generator 24 shown in FIG. 2 according to a preferred embodiment of the present invention. The color-texture distance generator 24 includes a color weight value calculator 100, a texture weight value calculator 102, first and second multipliers 104 and 106, and an adder 108.

The color weight value calculator 100 shown in FIG. 9 calculates a color weight value $w_c(u', v')$ as expressed by Equation (12) and outputs the calculated color weight value to the first multiplier 104:

$$w_c(u', v') = \hat{w}_c + \hat{w}_t[1 - t(u', v')p(u', v')]s(u', v') \quad (12)$$

where $\hat{w}_c$ and $\hat{w}_t$ denote color and texture weighting constants, respectively. A texture degree t(u', v') is expressed by Equation (13):

$$t(u', v') = \frac{T(u') + T(v')}{2 * T_{\max}} \quad (13)$$

where $T_{max}$ denotes a maximum of texture degrees. T(u') is expressed by Equation (14):

$$T(u') = \sum_{z=1}^{Z} W^z \sum_{k=1}^{K} t_k^z(u') \quad (14)$$

where $t_k^z(u')$ is an average texture value having a direction k at a size z of the region u'. A weight value $w_z$ denotes a weighting coefficient shown in Equation (3). Furthermore, p(u'v') in Equation (12) is expressed by Equation (15):

$$p(u', v') = F\left[\frac{\min[P(u'), P(v')]}{P_o}\right] \quad (15)$$

where $P_o$ denotes a threshold value of the sizes of segmented regions marked in a fundamental region division map. s(u', v') in Equation (12) is expressed by Equation (16):

$$s(u', v') = 0.5 + 0.5F\left[\frac{\max[S(u'), S(v')]}{S_o}\right] \quad (16)$$

where $S_o$ denotes a threshold value of saturation. Functions F in Equations (15) and (16) are used to suppress an adverse effect caused by extremely small-sized or low saturation regions. The texture weight value calculator 102 shown in FIG. 9 calculates a texture weight value $w_t(u', v')$ as expressed by Equation (17) and outputs the calculated texture weight value to the second multiplier 106:

$$w_t(u', v') = [1 - s(u', v')](\hat{w}_c + \hat{w}_t) + \hat{w}_t s(u', v')t(u', v')p(u', v') \quad (17)$$

The color weight value calculator 100 and the texture weight value calculator 102 input an average texture feature through an input terminal IN5 (the input terminal IN5 corresponds to the input terminal IN3 shown in FIG. 2).

Also, the color weight value calculator 100 and the texture weight value calculator 102 may receive as input required values among the color and texture weighting constants, the maximum of the texture degree, the average texture value, the weighting coefficient, and the threshold values for the sizes and saturations of segmented regions marked in a fundamental region division map from the outside through the input terminal IN5, or may prestore them.

The first multiplier 104 multiplies the color weight value $w_c(u', v')$ output from the color weight value calculator 100 by the color distance $D_c$ as shown in Equations (1) or (2) and outputs the multiplication result to the adder 108. The second multiplier 106 multiplies the texture weight value $w_t(u', v')$ output from the texture weight value calculator 102 by the texture distance $D_t$ shown in Equation (3) and outputs the multiplication result to the adder 108. The adder 108 adds the multiplication result from the second multiplier 106 to the multiplication result from the first multiplier 104 and outputs the result as expressed by Equation (18) to the image graph simplification unit 48 through an output terminal OUT3 as a color-texture distance $\hat{D}(u', v')$ required for simplifying an image graph:

$$\hat{D}(u', v') = w_c(u', v') D_c(u', v') + w_t(u', v') D_t(u', v') \quad (18)$$

where $D_c(u', v')$ and $D_t(u', v')$ denote color and texture distances, respectively, and are equal to the color and texture distances defined by Equation (4).

As described above, the color weight value $w_c$ and the texture weight value $w_t$, which are utilized for calculating the color-texture distance used in the image graph simplification unit 48, are not predetermined values but variables. This is because the color-texture distance needs to be adjusted if the texture degree, size and saturation of segmented regions vary. For example, if the sizes $p(u', v')$ of the segmented regions u' and v' are less than the threshold value $P_o$ for the sizes of segmented regions, the color weight value $w_c(u', v')$ shown in Equation (18) increases while the texture weight value $w_t(u', v')$ decreases. If the texture degree $t(u', v')$ of the segmented regions u' and v' increases, the color weight value $w_c(u', v')$ decreases while the texture weight value $w_t(u', v')$ increases.

Based on the above configuration, a process of performing step 38 in the image graph simplification unit 48 will now be described.

First, regions marked in the image graph output from the main region section unit 46 are arranged in order of decreasing size. Next, the color-texture distance between an arbitrary central region (hereinafter called "base region") and each of adjacent regions connected to the base region among the arranged regions is calculated using Equation (18). If the calculated color-texture distance is no greater than the second threshold value θ, the base region and the adjacent regions are merged. That is, the adjacent regions are merged into the base region. If the base region embraces the adjacent region(s) in this way, a portion of the image graph relating to the base region such as a connection relationship between the base region and each adjacent region needs to be modified as features of the base region such as color, texture, size, and edge change. The merging of a newly modified base region and its adjacent regions is again performed in the same manner. When the process of modifying the base region and merging the adjacent regions into modified base region is finished, the next largest region is newly designated as a base region to perform the region merging process again. The merging process is repeated until it has been performed on all regions in the image graph.

A process of simplifying the image graph cannot be perfectly conducted regardless of the second threshold value θ. To overcome this problem, the image graph simplification unit 48 may be divided into a plurality of sub-region merging portions. For this purpose, the color and texture weight values and the color and texture distances in Equation (18) are different in each sub-region merging portion, and the second threshold value θ dynamically changes depending on the size of a region.

Figure 10:
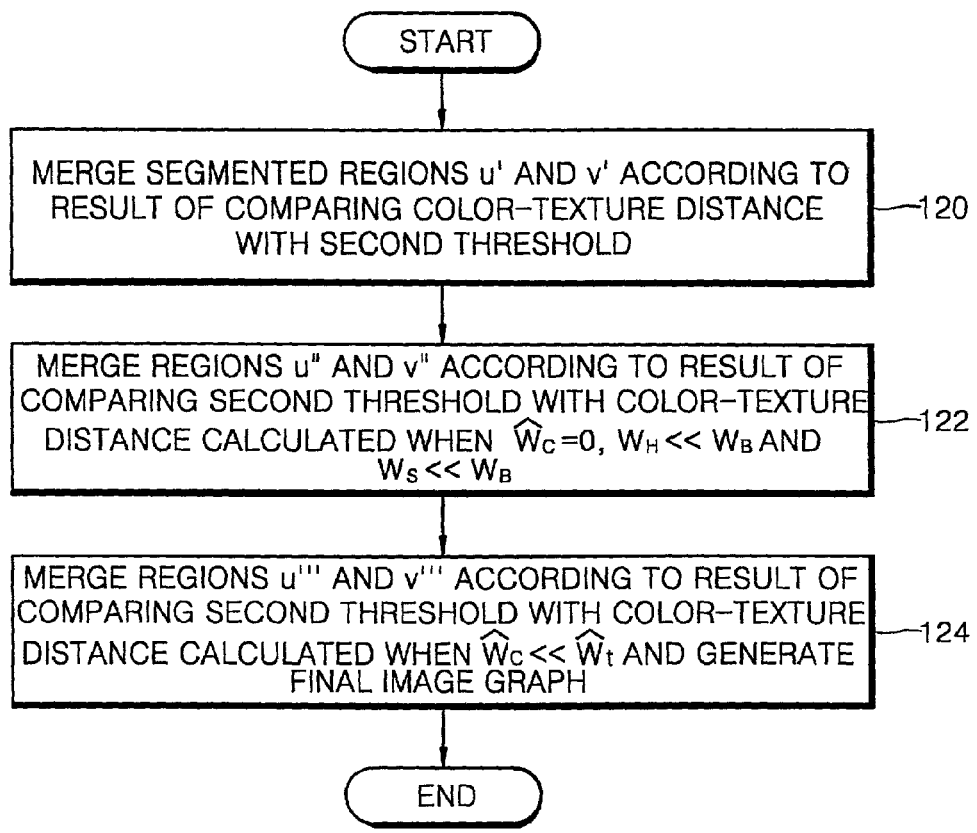
FIG. 10 is a flowchart showing a process of simplifying an image graph in the image graph simplification unit of FIG. 4.
Figure 11:
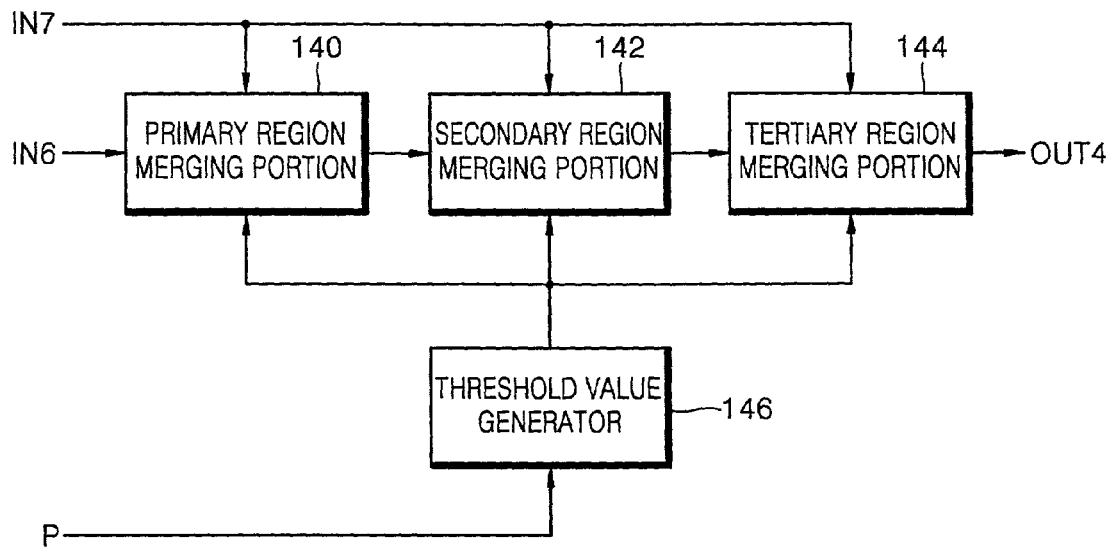
FIG. 11 is a block diagram of the image graph simplification unit according to a preferred embodiment of the present invention.

More specifically, FIG. 10 is a flowchart showing a process of simplifying the image graph in the image graph simplification unit 48 shown in FIG. 4. Referring to FIG. 10, the process includes primary, secondary, and tertiary merging steps 120, 122, and 124. FIG. 11 is a block diagram of the image graph simplification unit according to a preferred embodiment of the present invention. Referring to FIG. 11, the image graph simplification unit 48 includes primary, secondary, and tertiary region merging portions 140, 142 and 144, and a threshold value generator 146. The threshold value generator 146 dynamically changes the second threshold value θ as expressed by Equation (19) and outputs the changed second threshold value θ to the primary, secondary, and tertiary region merging portions 140, 142, and 144.

$$\theta = \alpha \left( \frac{1}{P' + P'_o} + \beta \right) \quad (19)$$

Here, P' denotes the size of a smaller region of two compared regions, and $P'_o$ is a constant representing a predetermined size that the smaller region can typically have, α denotes a threshold value constant and αβ is a threshold value for a larger region of the two compared regions.

The primary region merging portion 140 compares the color-texture distance as expressed by Equation (18) with the second threshold value θ received from the threshold value generator 146, merges two segmented regions u' and v' indicated in the image graph if the color-texture distance is less than or equal to the second threshold value θ, and outputs a first intermediate image graph reflecting the final result of merging in this way to the secondary region merging portion 142 (step 120). The performance of the primary region merging portion 140 can be improved by gradually increasing the threshold value constant a in Equation (19).

Following step 120, the secondary region merging portion 142 compares a first color-texture distance with the second threshold value θ, merges two regions u" and v" indicated in the first intermediate image graph if the first color-texture distance is less than or equal to the second threshold value θ, and outputs a second intermediate image graph reflecting the final result of merging in this way to the tertiary region merging portion 144 (step 122). Here, the first color-texture distance is obtained by substituting into Equation (18) color and texture weight values calculated from the Equations (12) and (17), respectively, when a color weighting constant $\hat{w}_c$ is set to "0", and texture and color distances calculated from Equation (3) and Equation (1) or (2), respectively, when $W_H \ll W_B$, and $W_S \ll W_B$. That is, the first and second multipliers 104 and 106 of the color-texture distance generator 24 shown in FIG. 2 and in detail in FIG. 9 multiply a color weight value $w_c(u", v")$ and a texture weight value $w_t(u", v")$ output from the color weight value calculator 100 and the texture weight value calculator 102, respectively, when the color weighting constant $\hat{w}_c$ is '0', by a color distance and a texture distance, respectively, which are output from the color and texture distance calculators 20 and 22, respectively, when $W_H \ll W_B$, and $W_S \ll W_B$. In this case, the adder 108 adds the multiplication results together, and outputs the addition result to the image graph simplification unit 48 through the output terminal OUT3 as the first color-texture distance. Step 122 can be performed only when the regions u" and v" have very low brightness.

After step 124 has been performed, the tertiary region merging portion 144 compares a second color-texture distance with the second threshold value θ received from the threshold value generator 146, merges two regions u'" and v'" marked in the second intermediate image graph if the second color-texture distance is less than or equal to the second threshold value θ, and outputs a final image graph reflecting the final result of merging in this way through an output terminal OUT4 (step 124). Here, the second color-texture distance is obtained by substituting into Equation (18) color and texture weight values calculated when $\hat{w}_c \ll \hat{w}_t$ from Equations (12) and (17), respectively, and color and texture distances calculated from Equation (1) or (2) and Equation (3), respectively. That is, the first and second multipliers 104 and 106 of the color-texture distance generator 24 shown in FIG. 9 multiply a color weight value $w_c(u''', v''')$ and a texture weight value $w_t(u''', v''')$ output when $\hat{w}_t \ll \hat{w}_c$ from the color weight value calculator 100 and the texture weight value calculator 102, respectively, by a color distance and a texture distance, respectively. In this case, the adder 108 adds the multiplication results to each other, and outputs the addition result to the image graph simplification unit 48 through the output terminal OUT3 as the second color-texture distance. Step 124 can be performed by the tertiary region merging portion 144 only when the regions u'" and v'" have a large texture degree.

Figure 12A:
FIG. 12A shows an input or preprocessed image and FIG. 12B shows regions sectioned by a method and apparatus for sectioning an image into a plurality of regions according to the present invention.
Figure 12B:
Figure 13A:
FIG. 13A shows an input or preprocessed image and FIG. 13B shows regions sectioned by a method and apparatus for sectioning an image into a plurality of regions according to the present invention.
Figure 13B:
Figure 14A:
FIG. 14A shows an input or preprocessed image and FIG. 14B shows regions sectioned by a method and apparatus for sectioning an image into a plurality of regions according to the present invention.
Figure 14B:

FIGS. 12A and 12B show an input or preprocessed image, and regions of the image sectioned by a method and apparatus for sectioning an image into a plurality of regions according to the present invention, respectively. FIGS. 13A and 13B show another input or preprocessed image, and regions sectioned by a method and apparatus for sectioning an image into a plurality of regions according to the present invention, respectively. FIGS. 14A and 14B show yet another input or preprocessed image, and regions of the image sectioned by a method and apparatus for sectioning an image into a plurality of regions according to the present invention, respectively. The image shown in FIGS. 12A, 13A, or 14A is segmented into, for example, 16,000 regions, in the main region section unit 46, and the image graph simplification unit 48 reduces the number of segmented regions to sixteen, that is, merges the segmented regions in order to simplify them. In this case, a final image graph having information about the simplified result is used to obtain the sectioned image shown in FIGS. 12B, 13B, or 14B.

The method and apparatus for measuring a color-texture distance according to the present invention and the method and apparatus for sectioning an image into a plurality of regions using the measured color-texture distance according to the present invention can be effectively used in digital interactive video systems, for example, interactive video application of digital broadcasting. In concert with the popularization of digital broadcasting, much research is focused on developing a digital interactive video system which enables a user to directly and actively exchange information with a broadcaster instead of passively obtaining information by watching a broadcast. For example, in a digital interactive video system, if a user directly selects a desired object on a screen in TV dramas, movies, educational programs, advertisements, shopping programs, auctions, etc., which are broadcast, in order to obtain information about the desired object, the information is displayed on the screen. For example, the on-screen wardrobe of popular singers, furniture and characters displayed on TV dramas, ingredients and recipes required for cooking programs, and so on, may be meaningful objects to the user. If the user selects one of these meaningful objects, information about the selected object can be provided to the user. To accomplish this, meaningful objects existing in broadcast images need to be effectively distinguished. To effectively differentiate a region occupied by a meaningful object from a background or other objects, various features of the meaningful object should be utilized to the fullest. The features of the selected object may include color, texture and shape. In particular, color or texture gives a clue to simplifying the object into a single region. The method and apparatus for sectioning an image into a plurality of regions according to the present invention provides a final image graph, which can accurately distinguish regions of an image using both color and texture distances, based on the fact that the probability of regions having the same color or texture being a meaningful object is high. Furthermore, in a case where a selected object is composed of various colors or various textures, the method and apparatus for sectioning an image into a plurality of regions according to the present invention makes it possible to effectively distinguish a region of the meaningful object from other regions by merging segmented regions of the image.

In addition, the method and apparatus for measuring a color-texture distance and the method and apparatus for sectioning an image into a plurality of regions using the measured distance according to the present invention may also serve as a fundamental module in products and software relating to digital broadcasting.

Meanwhile, the method and apparatus for sectioning an image into a plurality of regions according to the present invention can effectively be used in searching for and recognizing a meaningful object existing in an image and tracking the meaningful object. That is, information about a region occupied by the meaningful object is extracted using a final image graph generated by the method and apparatus according to this invention. In this case, this invention can be used in searching or recognizing a screen on which an object having information similar to the extracted information was previously displayed, and tracking all screens on which an object having information similar to the extracted information was previously displayed. Furthermore, the extracted information may also be used in editing or manufacturing an image.

Furthermore, if only meaningful objects in an image to be compressed according to image compression standards such as MPEG are to be effectively transmitted, this invention can maximize transmission efficiency by compressing only extracted information more finely.

As described above, the method and apparatus for measuring a color-texture distance and the method and apparatus for sectioning an image into a plurality of regions using the measured color-texture distance provides an accurate color-texture distance, for which the conditions of low brightness and low saturation, sizes of regions, lengths of edges between the regions, etc., are considered, thereby effectively segmenting the image compared to conventional art. Furthermore, the present invention allows regions of the image to be segmented accurately using a color-texture distance calculated by color and texture, and enables the speed at which the image is segmented to be maintained stably by calculating texture feature values in a simple way. Furthermore, the present invention achieves excellent image segmentation performance by virtue of several cycles of region merging, and as a result, extracts regions having the same colors or the same textures from an input image in a form that humans can perceive.

What is claimed is:

1. A method of measuring a color-texture distance, comprising the steps of:
   (a) assigning different degrees of importance to a brightness difference, a saturation difference, and a hue difference between two points in a color feature space constituted of color feature values of pixels in an image and adding the brightness difference, the saturation difference, and the hue difference in proportion to the assigned degrees of importance to obtain a color distance between the two points;
   (b) obtaining a texture distance between the two points using a difference between texture feature values of the two points and weighting coefficients applied to multi scales of a texture, in a texture feature space constituted of texture feature values for the pixels; and
   (c) multiplying a color weight value and a texture weight value by the color distance and the texture distance, respectively, adding the multiplication results to each other, and obtaining the color-texture distance between the two points,
   wherein the degrees of importance are determined on a basis that a hue is more important than a brightness or a saturation, a color becomes black as the brightness approaches an absolute value, and the hue has an arbitrary value as the saturation approaches the absolute value.

2. The method of claim 1, wherein, in step (a), the color distance $D_{BHS1}(x,y)$, wherein x and y denote the two points in the color feature space, is computed according to the following equation:

$$D_{BHS1}(x,y) = W_B|B(x)-B(y)| + F_H[\min(S(x),S(y))](a\overline{B}+b)\overline{S}|H(x)-H(y)| + F_S(\overline{S})\overline{B}|S(x)-S(y)|$$

where B(o), H(o), and S(o) denote the brightness, the hue, and the saturation for a point o, respectively, wherein the point o refers to at least one of point x and y, $\overline{B}$ and $\overline{S}$ denote an average of B(x) and B(y) and an average of S(x) and S(y), respectively, $W_B$, a and b are constants, and $F_S(j)$ and $F_H(j)$ denote linear correction functions for the saturation and the hue, respectively.

3. The method of claim 2, wherein the linear correction function $F_S(j)$ or $F_H(j)$ is j if j is less than 1, and 1 if j is greater than or equal to 1.

4. The method of claim 2, wherein, in step (b), the texture distance $D_t(x,y)$ is computed as expressed by the following equation:

$$D_t(x, y) = \sum_{z=1}^{Z} W^z \sum_{k=1}^{K} |t_k^z(x) - t_k^z(y)|$$

where $W^z$ is the weighting coefficient, $t_k^z(x)$ and $t_k^z(y)$ denote the texture feature values of x and y, k=1, 2, ..., K, and Z is a predetermined number.

5. The method of claim 4, further comprising the steps of:
   (d) smoothing the input image a predetermined number of times and enhancing edges in the smoothed image;
   (e) calculating the color feature values and the texture feature values on a pixel-by-pixel basis and returning to step (a);
   (f) after step (c), comparing the color-texture distance with a first threshold value, segmenting the image into regions according to the comparison result, and generating an image graph from a fundamental region section map including information about the segmented regions of the image, based on a pyramidal recursive approach; and
   (g) comparing the color-texture distance with a second threshold value, merging regions marked in the image graph according to the comparison result to generate a final image graph.

6. The method of claim 5, wherein the color-texture distance used in step (f) is determined using the predetermined color weight value $w_c$ and the predetermined texture weight value $w_t$.

7. The method of claim 6, wherein the color-texture distance used in step (g) is determined using the color weight value $w_c(u', v')$ and the texture weight value $w_t(u', v')$, both of which vary depending on features of segmented regions u' and v'.

8. The method of claim 7, wherein the features of the segmented regions includes a texture degree t(u', v'), a size p(u', v') and a saturation s(u', v') for the segmented regions u' and v'.

9. The method of claim 8, wherein the color weight value $w_c(u', v')$ is computed as expressed by the following equation:

$$w_c(u', v') = \hat{w}_c + \hat{w}_t[1-t(u', v')p(u', v')]s(u', v')$$

where $\hat{w}_c$ and $\hat{w}_t$ denote color and texture weighting constants, respectively, $$t(u', v') = \frac{T(u') + T(v')}{2 * T_{\max}},$$

wherein T(u') and T(v') denotes texture as a function of segmented regions u' and v', respectively, and $T_{max}$ denotes a maximum of the texture degrees, $$p(u', v') = F\left[\frac{\min[P(u'), P(v')]}{P_o}\right],$$

wherein P(u') and P(v') denote sizes of the segmented regions u' and v', and $P_o$ denotes a threshold value of the sizes of the segmented regions u' and v', and wherein $S_o$ denotes a threshold value of saturation for the segmented regions u', and v', and $$s(u', v') = 0.5 + 0.5F\left[\frac{\min[S(u'), S(v')]}{S_o}\right],$$

wherein S(u') and S(v') denote saturation as a function of segmented regions u' and v', and $S_o$ denotes a threshold value of saturation for the segmented regions u' and v', and in the above eguations functions F are used to suppress an adverse effect caused by small-size or low saturation regions, and wherein the texture weight value $w_t(u', v')$ is computed as expressed by the following equation:

$$w_t(u', v') = [1-s(u', v')](\hat{w}_c + \hat{w}_t) + \hat{w}_t s(u', v')t(u', v')p(u', v').$$

10. The method of claim 9, wherein step (g) comprises the steps of:

(g1) merging the two segmented regions u' and v' marked in the image graph according to the result of comparing the color-texture distance with the second threshold value;

(g2) comparing the second threshold value with the color-texture distance obtained with the color weight value $w_c(u'', v'')$ and the texture weight value $w_t(u'', v'')$ determined when the color weighting constant $\hat{w}_c$ is set to "0" and the color and texture distances calculated when $W_H \ll W_B$, and $W_S \ll W_B$, where u'' and v'' denote two regions marked in the image graph in which the final result of merging the regions in step (g1) is reflected, and merging the two regions u'' and v'' according to the comparison result; and (g3) comparing the second threshold value with the color-texture distance calculated using the color weight value $w_c(u''', v''')$ and the texture weight value $w_t(u''', v''')$ determined when $\hat{w} \ll \hat{w}_t$, where u''' and v''' denote two regions marked in the image graph in which the final result of merging the regions in step (g2) is reflected, merging the two regions u''' and v''' according to the comparison result, and generating the final image graph by reflecting the final result of merging the two regions, wherein the second threshold value varies depending on sizes of the regions.

11. The method of claim 1, wherein, in step (a), the color distance $D_{BHS2}^2(x,y)$, wherein x and y denote the two points in the color feature space, is computed according to the following equation:

$$D_{BBHS2}^2(x,y) = W_B[B(x)-B(y)]^2 + W_H F_B[B(x),B(y)]F_S[S(x),S(y)][H(x)-H(y)]^2 + W_S F_B[B(x),B(y)][S(x)-S(y)]^2$$

where B(o), H(o), and S(o) denote the brightness, the hue, the saturation for a point o, respectively, wherein the point o refers to at least one of point x and y, $W_B$, $W_H$ and $W_S$ are constants, and $F_s(\cdot, \cdot)$ and $F_B(\cdot, \cdot)$ denote nonlinear correction functions for the saturation and the brightness, respectively.

12. An apparatus for measuring a color-texture distance comprising:

a color distance calculator that assigns different degrees of importance to a brightness difference, a saturation difference, and a hue difference between two points in a color feature space constituted of color feature values for pixels in an image, adds the brightness difference, the saturation difference, and the hue difference in proportion to the assigned degrees of importance, and outputs the added result as a color distance between the two points;

a texture distance calculator that inputs texture feature values for the two points in a texture feature space constituted of texture feature values for the pixels in the image, detects a difference between the input texture feature values, calculates a texture distance between the two points from weighting coefficients applied to multiple scales of a texture and the detected difference, and outputs the calculated texture distance; and a color-texture distance generator that multiplies a color weight value by the color distance output from the color distance calculator, multiplies a texture weight value by the texture distance output from the texture distance calculator, adds the multiplication results together, and outputs the addition result as a color-texture distance, wherein the degrees of importance are determined on a basis that a hue is more important than a brightness or a saturation, a color becomes black as the brightness approaches an absolute value, and the hue has an arbitrary value as the saturation approaches the absolute value.

13. The apparatus of claim 12, wherein the color distance calculator computes the color distance $D_{BHS1}(x,y)$, wherein x and y denote the two points in the color feature space, according to the following equation:

$$D_{BHS1}(x,y) = W_B|B(x)-B(y)| + F_H[\min(S(x),S(y))](a\overline{B}+b)$$
$$\overline{S}|H(x)-H(y)| + F_S(\overline{S})\overline{B}|S(x)-S(y)|$$

where B(o), H(o), and S(o) denote the brightness, the hue, the saturation for a point o, respectively, wherein the point o refers to at least one of point x and y, $\overline{B}$ and $\overline{S}$ denote an average of B(x) and B(y) and an average of S(x) and S(y), respectively, $W_B$, a and b are constants, and $F_S(j)$ and $F_H(j)$ denote linear correction functions for the saturation and the hue, respectively.

14. The apparatus of claim 13, wherein the linear correction function $F_S(j)$ or $F_H(j)$ is j if j is less than 1, and 1 if j is greater than or equal to 1.

15. The apparatus of claim 13, wherein the texture distance calculator computes the texture distance $D_t(x,y)$ according to the following equation:

$$D_t(x, y) = \sum_{z=1}^{Z} W^z \sum_{k=1}^{K} |t_k^z(x) - t_k^z(y)|$$

where $W^z$ is the weighting coefficient, $t_k^z(x)$ and $t_k^z(y)$ denote texture feature values of x and y, k=1, 2. . . , K, and Z is a predetermined number.

16. An apparatus for sectioning an input image into a plurality of regions using the color-texture distance output from the color-texture distance generator of claim 15, the apparatus comprises:

an image preprocessor that smooths the input image a predetermined number of times, enhances edges in the smoothed image, and outputs the resulting image;

a feature value calculator that calculates the color feature values and the texture feature values from the image output from the image preprocessor for each pixel and outputs the calculated color and texture feature values to the apparatus for measuring a color-texture distance;

a main region section unit that compares the color-texture distance output from the color-texture distance generator with a first threshold value, segments the image into regions according to the comparison result, generates an image graph from a fundamental region division map including information about the segmented regions based on a pyramidal recursive approach, and outputs the generated image graph; and an image graph simplification unit that compares the color-texture distance output from the color-texture distance generator with a second threshold value, simplifies the image graph according to the comparison result, and outputs a final image graph generated from the simplified image graph.

17. The apparatus of claim 16, wherein the color-texture distance generator multiplies the predetermined color weight value $w_c$ by the color distance, multiplies the predetermined texture weight value $w_t$ by the texture distance, adds the multiplication results to each other, and outputs the addition result to the main region section unit as the color-texture distance.

18. The apparatus of claim 17, wherein the color-texture distance generator multiplies the color weight value $w_c(u', v')$ and the texture weight value $w_t(u', v')$, both of which vary depending on a texture degree $t(u', v')$, a size $p(u', v')$ and a saturation $s(u', v')$ for segmented regions u' and v', by the color and texture distances, respectively, adds the multiplication results, and outputs the addition result to the image graph simplification unit as the color-texture distance.

19. The apparatus of claim 18, wherein the color-texture distance generator comprises:

a color weight value calculator that computes the color weight value $w_c(u', v')$ as expressed by the following equation:

$$w_c(u', v') = \hat{w}_c + \hat{w}_t[1-t(u', v')p(u', v')]s(u', v')$$

where $\hat{w}_c$ and $\hat{w}_t$ denote color and texture weighting constants, respectively, $$t(u', v') = \frac{T(u') + T(v')}{2 * T_{max}},$$

wherein $T(u')$ and $T(v')$ denotes texture as a function of segmented regions u' and v'. respectively, and $T_{max}$ denotes a maximum of the texture degrees for the segmented regions u' and v', $$p(u', v') = F\left[\frac{\min[P(u'), P(v')]}{P_o}\right],$$

wherein $P(u')$ and $P(v')$ denote size of the segmented regions u' and v', and $P_o$ denotes a threshold value for the sizes of the segmented regions u' and v', and $$s(u', v') = -.5 + 0.5F\left[\frac{\min[S(u'), S(v')]}{S_o}\right],$$

wherein $S(u')$ and $S(v')$ denote saturation as a function of segmented regions u' and v', and $S_o$ denotes a threshold value of saturation for the segmented regions u' and v', and in the above equations functions F are used to suppress an adverse effect caused by small-size or low saturation regions, and a texture weight value calculator that computes the texture weight value $w_t(u', v')$ as expressed by the following equation:

$$w_t(u', v') = [1-s(u', v')](\hat{w}_c+\hat{w}_t)+\hat{w}_ts(u', v')t(u', v')p(u', v').$$

20. The apparatus of claim 19, wherein the image graph simplification unit comprises:

a primary region merging portion that compares the color-texture distance with the second threshold value, merges the two segmented regions u' an v' marked in the image graph according to the comparison result, and outputs a first intermediate image graph generated by reflecting the final result of merging;

a secondary region merging portion that compares a first color-texture distance with the second threshold value, merges two regions u" and v" marked in the first intermediate image graph according to the comparison result, and outputs a second intermediate image graph generated by reflecting the final result of merging; and a tertiary region merging portion that compares a second color-texture distance with the second threshold value, merges two regions u''' and v''' marked in the second intermediate image graph according to the comparison result, and outputs the final image graph generated by reflecting the final result of merging, wherein the color-texture distance generator multiplies the color weight value $w_c(u'', v'')$ calculated from the color weight value calculator and the texture weight value $w_t(u'', v'')$ calculated from the texture weight value calculator when the color weighting constant $\hat{w}_c$ is set to "0" by the color and texture distances calculated from the color and texture distance calculators, respectively, when $W_H << W_B$, and $W_S << W_B$, adds the multiplication results, and outputs the addition result as the first color-texture distance, wherein the color-texture distance generator multiplies the color weight value $w_c(u''', v''')$ and the texture weight value $w_t(u''', v''')$ output from the color weight value calculator and the texture weight value calculator, respectively, when $\hat{w}_t << \hat{w}_c$, by the color and texture distances, respectively, adds the multiplication results, and outputs the addition result as the second color-texture distance; and wherein the second threshold value varies depending on the sizes of the regions.

21. The apparatus of claim 12, wherein the color distance calculator computes the color distance $D_{BHS2}^2(x,y)$, wherein x and y denote the two points in the color feature space, according to the following equation:

$$D_{BBHS2}^2(x,y) = W_B[B(x)-B(y)]^2 + W_HF_B[B(x),B(y)]F_S[S(x),S(y)][H(x)-H(y)]^2 + W_SF_B[B(x),B(y)][S(x)-S(y)]^2$$

where $B(o)$, $H(o)$, and $S(o)$ denote the brightness, the hue, the saturation for a point o (the point o refers to either point x or y), respectively, $W_B$, $W_H$, and $W_S$ are constants, and $F_S(\cdot, \cdot)$ and $F_B(\cdot, \cdot)$ denote nonlinear correction functions for the saturation and the brightness, respectively.

* * * * *